(12) United States Patent  (10) Patent No.: US 8,536,747 B1
Baggett  (45) Date of Patent: Sep. 17, 2013

(54) DIRECT CURRENT MULTI-STAGE MOTOR

(76) Inventor: Thomas E. Baggett, Jay, FL (US)

( * ) Notice: Subject to any disclaimer, the term of this patent is extended or adjusted under 35 U.S.C. 154(b) by 0 days.

(21) Appl. No.: 13/507,413

(22) Filed: Jun. 26, 2012

Related U.S. Application Data

(63) Continuation-in-part of application No. 12/930,284, filed on Jan. 3, 2011.

(51) Int. Cl.
  *H02K 29/00* (2006.01)
(52) U.S. Cl.
  USPC .......................... 310/114; 310/68 B; 310/268
(58) Field of Classification Search
  USPC .............. 310/68 B, 156.53, 156.59, 266, 268
  See application file for complete search history.

(56) References Cited

U.S. PATENT DOCUMENTS

| | | | |
|---|---|---|---|
| 1,858,506 A | 5/1932 | Jacobs | |
| 3,599,050 A | 8/1971 | Komatsu | |
| 3,891,905 A | 6/1975 | Muller | |
| 4,330,727 A | 5/1982 | Oudet | |
| 4,358,693 A | 11/1982 | Palmer | |
| 4,551,645 A | 11/1985 | Takahashi et al | |
| 4,568,862 A | 2/1986 | Tassinario | |
| 4,633,149 A | 12/1986 | Welterlin | |
| RE33,628 E | 7/1991 | Hahn | |
| 5,117,141 A | 5/1992 | Hawsey | |
| 5,127,485 A | 7/1992 | Wakuta | |
| 5,229,677 A | 7/1993 | Dade | |
| 5,334,899 A | 8/1994 | Skybyb | |
| 5,982,070 A * | 11/1999 | Caamano | 310/216.047 |
| 6,922,004 B2 | 7/2005 | Nashimoto | |
| 6,930,422 B2 * | 8/2005 | Rose | 310/156.32 |
| 7,514,833 B2 | 4/2009 | Hsu | |
| 7,815,535 B2 | 10/2010 | Ai | |

FOREIGN PATENT DOCUMENTS

| | | |
|---|---|---|
| DE | 4412898 A1 | 1/1995 |
| EP | 0388207 A2 | 1/1990 |
| JP | 07147753 A | 1/1995 |
| WO | WO 03/078863 | 1/2003 |

OTHER PUBLICATIONS

U.S. Appl. No. 12/930,284, filed Jan. 3, 2011, Baggett.

* cited by examiner

*Primary Examiner* — Tran Nguyen

(57) ABSTRACT

A three phase brushless direct current multi-stage motor, that is of the pancake type. The direct current multi-stage motor comprises a continuous and additive magnetic flux field loop with a plurality of flux paths that flow across the vertically wound stators sandwiched between the rotors. The rotors are embedded with a plurality of permanent magnets which are alternately spaced near the outer radius.

1 Claim, 9 Drawing Sheets

DIRECT CURRENT MULTI-STAGE MOTOR

CROSS-REFERENCE TO RELATED APPLICATIONS

This application is a Continuation-in-Part of Ser. No. 12/930,284, filed Jan. 3, 2011 by the present inventor, which is incorporated by reference.

| Reference Cited U.S. Pat. Documents | | |
|---|---|---|
| 12/930,284 | Jan. 03, 2011 | Baggett |
| 7,815,535 | Oct. 19, 2010 | Xiaolan, Sertell |
| 7,514,833 | Apr. 07, 2009 | Hsu, McKeever |
| 6,922,004 | Jun. 26, 2005 | Hashimoto, Zhou, |
| 5,334,899 | Aug. 02, 1994 | Skybyk |
| 5,229,677 | Jul. 20, 1993 | Dade, Leiding |
| 5,127,485 | Jul. 07, 1992 | Wakuta, Hotta |
| 5,117,141 | May 26, 1992 | Hawsey, Bailey |
| RE33,628 | Jun. 02, 1991 | Hahn |
| 4,633,149 | Dec. 30, 1986 | Welterlin |
| 4,568,862 | Feb. 04, 1986 | Tassinario |
| 4,551,645 | Nov. 05, 1985 | Takashi, Ogawa |
| 4,358,693 | Nov. 09, 1982 | Palmer |
| 4,330,727 | May 18, 1982 | Oudet |
| 3,891,905 | Jun. 04, 1975 | Muller |
| 3,599,050 | Aug. 01, 1971 | Komatsu |
| 1,858,506 | May 17, 1932 | Jacobs |

| FOREIGN PATENT DOCUMNETS | | | |
|---|---|---|---|
| DE | 4412898 | A1 | October 1995 |
| EP | 0388207 | A2 | September 1990 |
| JP | 07147753 | A | June 1995 |
| WO | WO 03/078863 | | September 2003 |

GOVERNMENT INTEREST

Nonapplicable

BACKGROUND OF THE ART

This invention relates to electric motors, particularly multi-rotor, multi-stator of the pancake family. Electric motors have been the mainstay of our way of life for over a hundred years and I suspect that they will be here for many more. Electric motors are manufactured in more ways, shapes, and sizes than one can imagine. However there must be improvements to the over-all efficiency of the electric motor before it can compete with the challenges of our dwindling natural resources. The electric motor in its best design set the stage for 746 watts per horsepower.

The force tending to move a conductor across the magnetic field is (F=Bli) in Newtons. Where B is measured in Webbers per meter$^2$, length is measured in meters, and current is measured in amperes. Let us suppose that if B can be increased by 10, then F must increase by 10. The formula for uncoupled inductors in series is ($L_t=L_1+L_2+L_3+\ldots$). The effective inductance of two in-phase series-connected inductances is determined by using the formula ($L_t=L_1+L_2+2M$). This can be accomplished by placing the magnetic field in series in a continuous loop. There is a need for lighter, more powerful and more efficient electric machines that can be adaptable to many applications.

SUMMARY

The preferred embodiment of this machine is a variable speed, reversible torque, brushless motor with a rotating continuous loop magnetic flux field that flows axially across the stationary vertical wound stators. The magnetic flux travels from end to end on a multiple of paths crossing the conductor windings of the stator forming a continuous and compounded magnetic loop.

ADVANTAGES

1. Light weight
2. Efficiency increases with an increase of radial size
3. No eddy current loss and no iron loss from heat
4. No cogging
5. High torque constant

Figure 1:
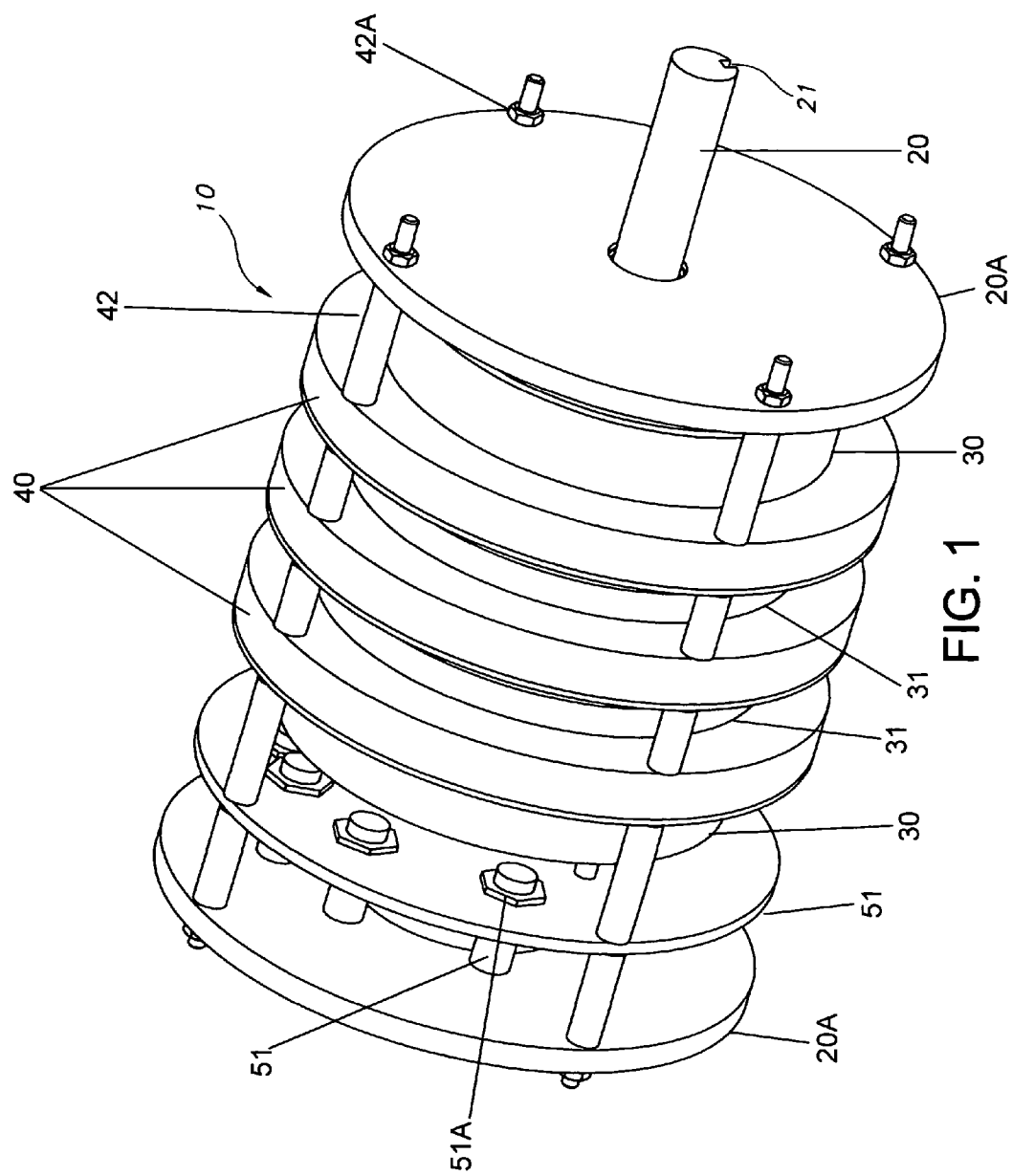
FIG. 1—isometric view of a direct current multi-stage motor
FIG. 2—side view of a direct current multi-stage motor
FIG. 3—exploded view of a motor (major components together)
FIG. 4—exploded view of an end rotor
FIG. 5—isometric view of an end rotor with sensor pins
FIG. 6—side view of an end rotor with sensor pins
FIG. 7—back view of an end rotor with milled recess for magnets and transfer plate
FIG. 8—exploded view of an inner rotor
FIG. 9—exploded view of a stator
FIG. 10—exploded view of a sensor plate

| REFERENCE NUMERALS | |
|---|---|
| 10. | Motor |
| 20. | Motor shaft |
| 20a. | Motor end plate |
| 20b. | Motor bearings |
| 21. | Motor shaft keyway |
| 22. | Motor shaft key |
| 30. | End rotor assembly |
| 31a. | Inner rotor half |
| 31b. | Inner rotor half |
| 32. | Magnet |
| 33. | Recessed pockets |
| 34. | Magnetic transfer plate |
| 34a. | Magnetic transfer plate pins |
| 34b. | Magnetic transfer plat |
| 35. | Rotor keyway |
| 36. | Rotor hubs |
| 36a. | Rotor hub screws |
| 40. | Stator assembly |
| 41. | Stator cover |
| 42. | Stator support assembly |
| 42a. | Stator support assembly nut |
| 44. | Stator winding |
| 50. | Magnet sensor plate |
| 51. | Magnet sensors |
| 51a. | Magnet sensors nuts |

DETAILED DESCRIPTION

Figure 2:
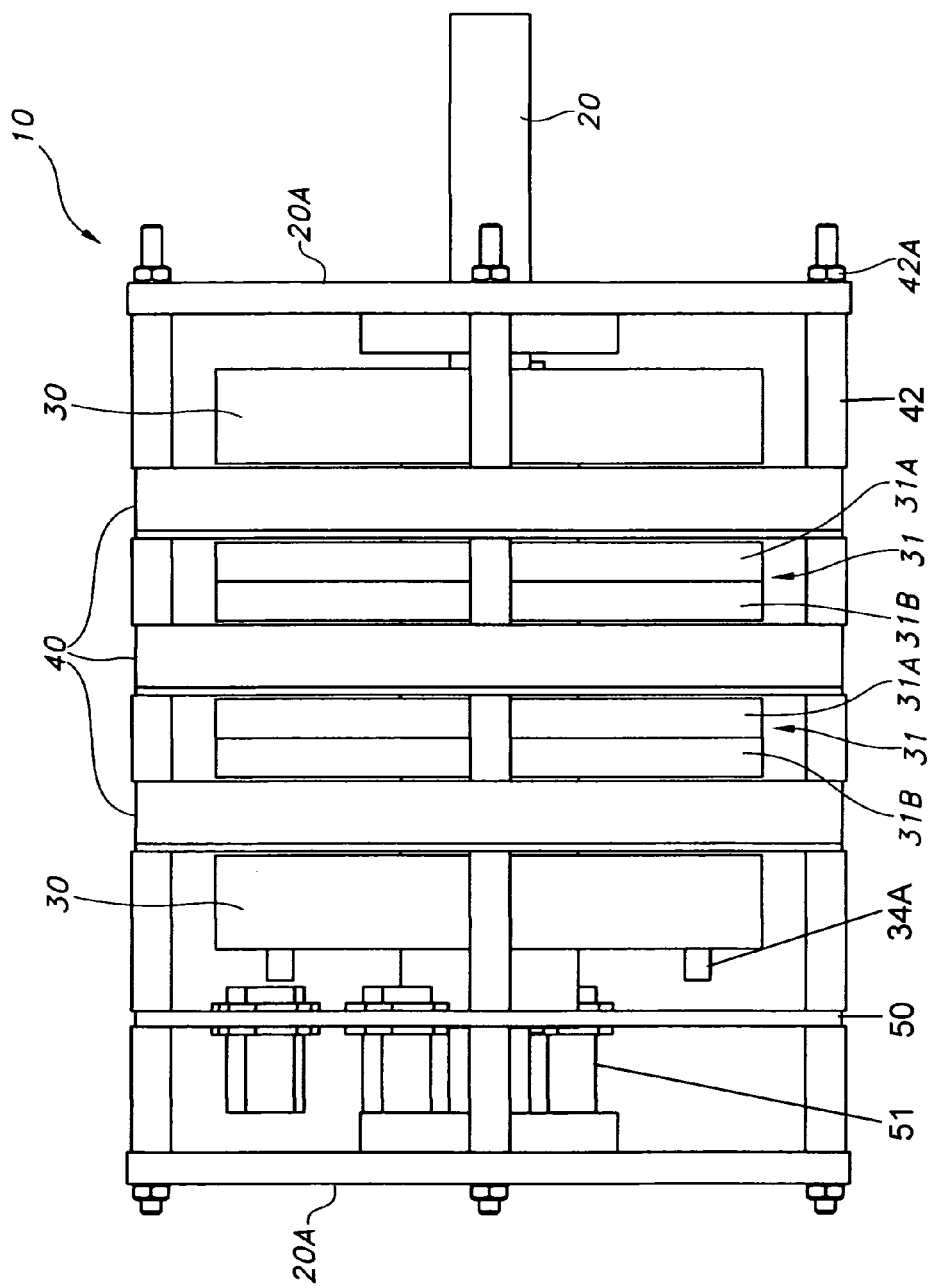

FIG. 1 is an isometric view of a direct current multi-stage motor 10. FIG. 2 is a side view of a direct current multi-stage motor 10 with two end rotors 30 and two inner rotors 31, and three fixed wire wound vertical stators 40 which provide a path for current flow in the rotating magnetic field. The number and size of rotors, magnets and stators can be increased or decreased depending on the physical size and horsepower requirements. The machine is a brushless direct current motor.

Figure 3:
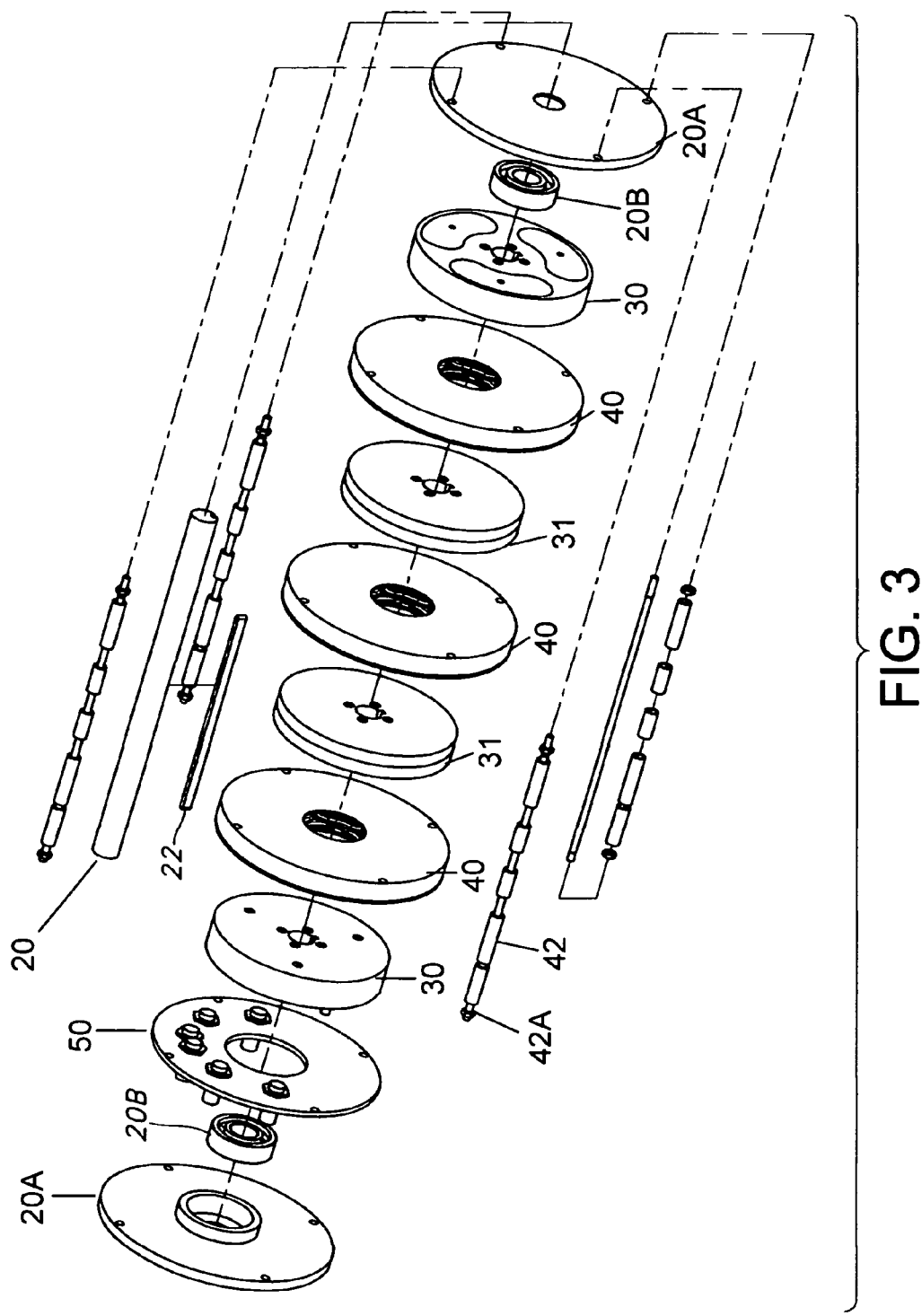
Figure 4:
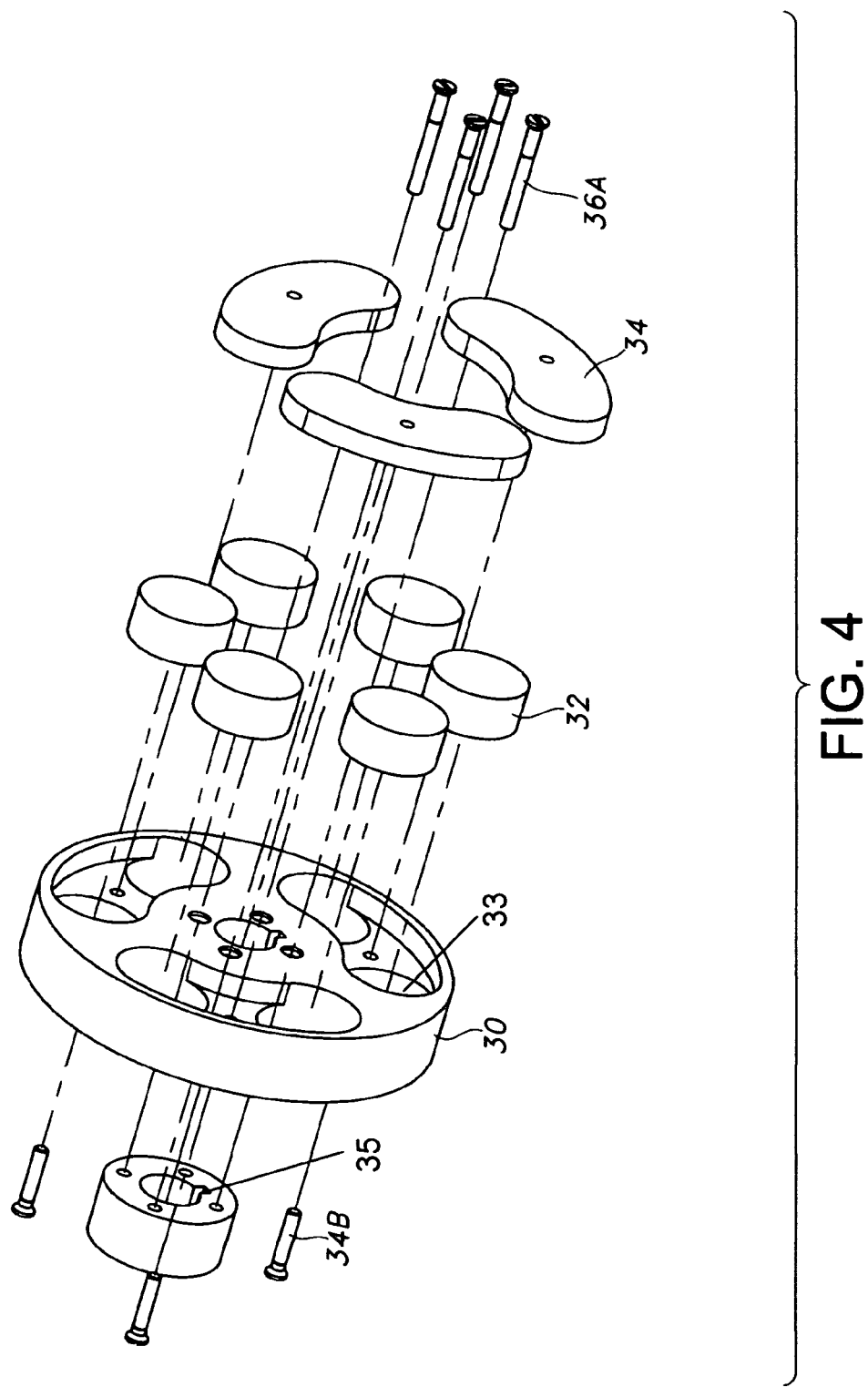
Figure 6:
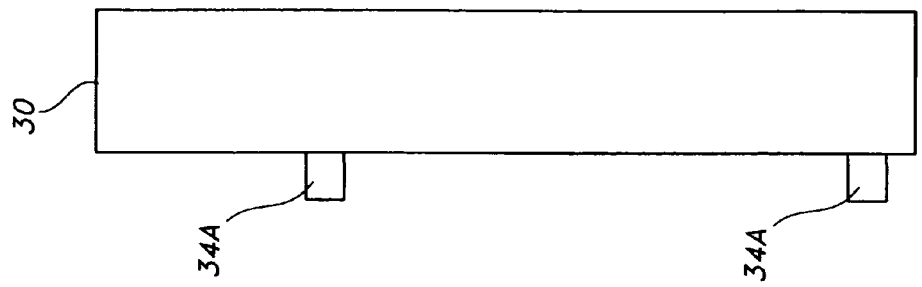
Figure 5:
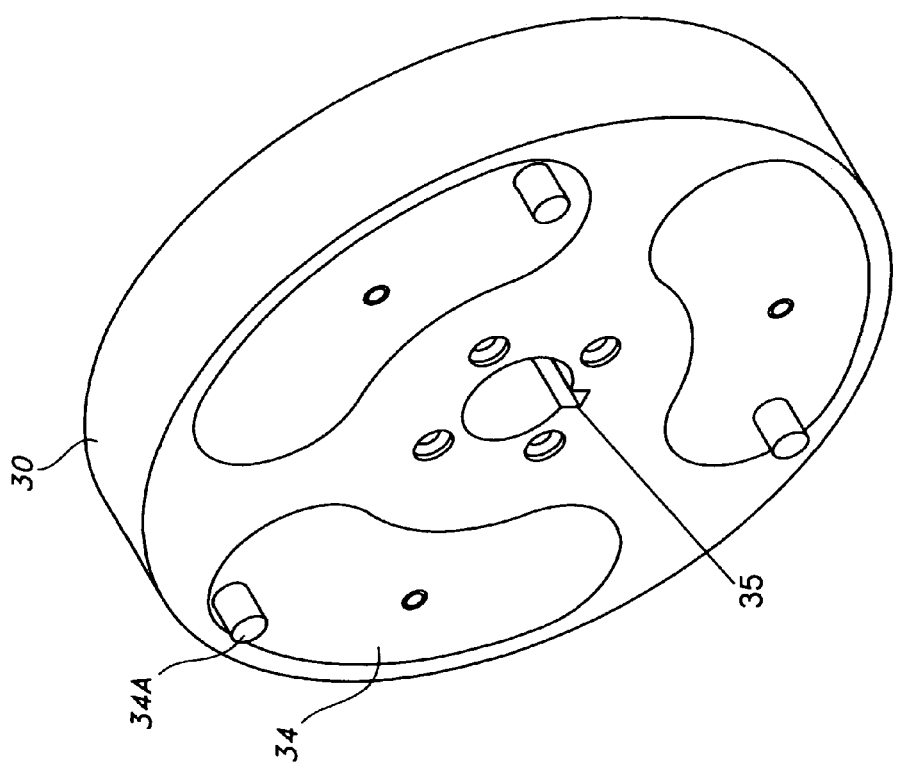
Figure 7:
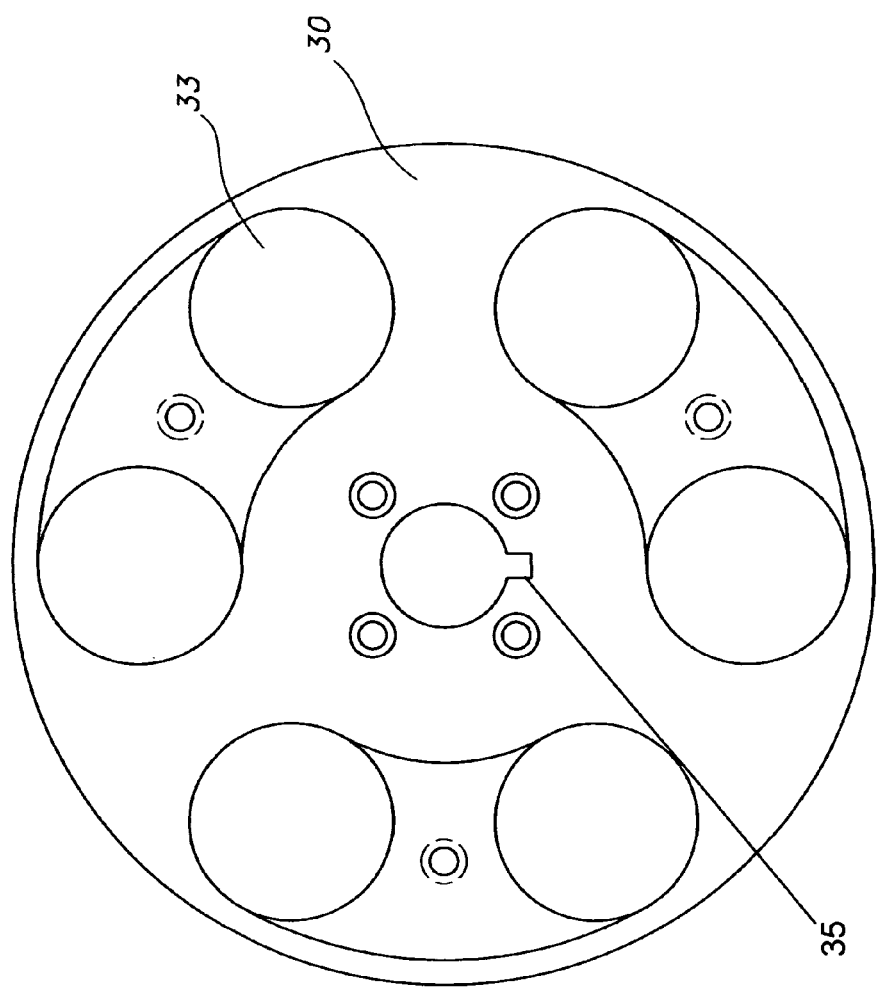

FIG. 3 is an exploded view of direct current multi-stage motor 10, (major components together, end rotors, stators and inner rotors). Referring back to FIG. 1, the motor shaft has a keyway 21; the keyway provides a means to secure the rotors 30 and 31 and align the rotating magnetic field. FIG. 4 is an exploded view of the end rotors 30 with magnetic transfer plates 34 that connect the magnet poles together. FIG. 5 is an isometric view of an end rotor 30. FIG. 6 is a side view of an end rotor 30. FIG. 7 is a view of the back side an end rotor 30 with the recessed pockets 33 and milled area for the magnetic transfer plates 34.

Figure 8:
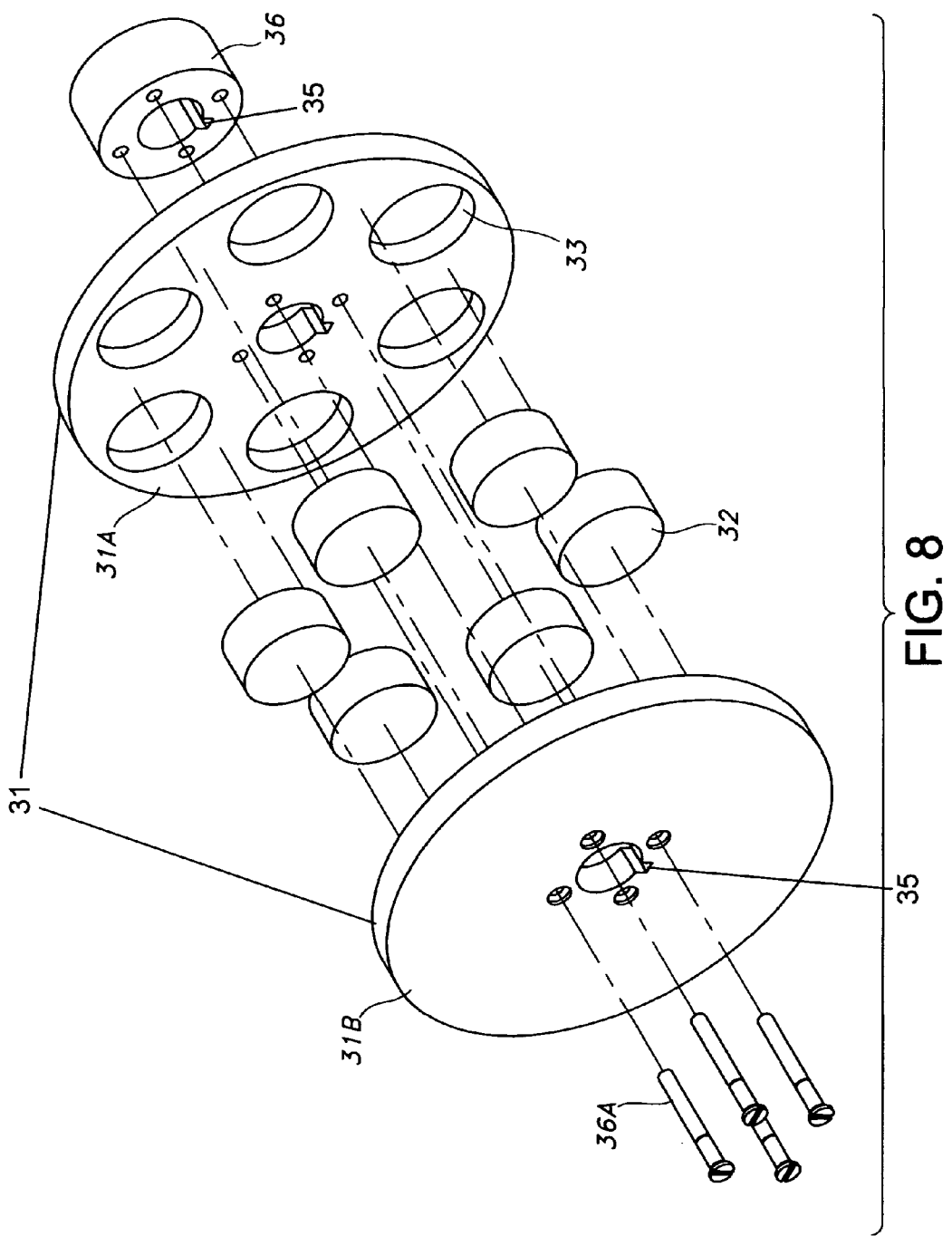

The inner rotors 31 consist of two identical circular sheets of 6061 T-6 aluminum, 31a and 31b with recessed pockets 33 machine into each half to provide a means to hold the magnets 32 in place. FIG. 8 is an exploded view of an inner rotor assembly.

Figure 10:
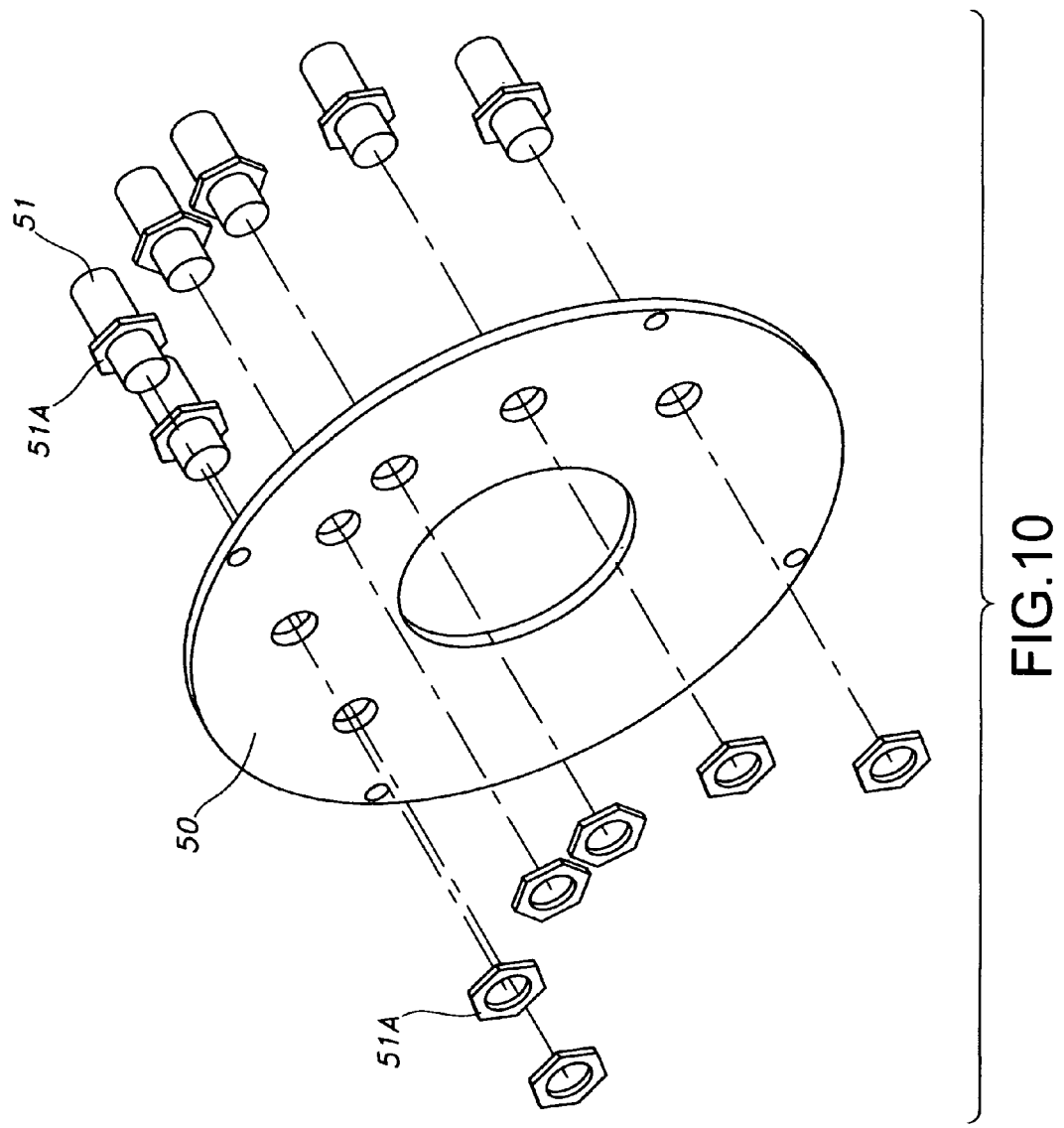

The rotor assembly 31 is assembled by inserting the magnets 32 into the recessed pockets 33 in rotor half 31b; starting at the recessed hole directly above the keyway 35 FIG. 10 and install the first magnet 32 with the North Pole facing down. The remainder of the magnets can be placed in clockwise or counter-clockwise direction alternating the magnet poles and continue the same pattern for all rotors. A magnetic pole detector or equivalent tool must be used to insure that the magnetic poles are properly placed with the correct polarization.

The next step is to attach the second half of the rotor 31a to the first half with the keyway aligned with the first half. The next step is to align the keyways of the rotor with the rotor hub 36 FIG. 8 and attach to the rotor hub 36 with screws 36a FIG. 8. The magnetic field should be checked with a magnet pole detector to insure the correct polarization before attaching the rotor hub 36 and installing on motor shaft 20.

FIG. 4 is an exploded view of an end rotor 30. The end rotor 30 is made from a circular sheet of aluminum material, 6061 T-6 or better. The extra thickness is due to the magnetic transfer plates 34 attached to the back side of the rotor. The magnetic transfer plates 34 connect the magnet poles together and redirect the magnetic flux back through the motor.

Referring to FIGS. 4, 5 and 6; the end rotor assembly 30 comprises one rotor hub 36 and one magnet support circular sheet 30 and a plurality of magnets 32 and magnetic transfer plates 34. The back side of the end rotor 30 has been milled to accept the magnets 32 and magnetic transfer plates 34 (see FIG. 7). The assembly order of the end rotor magnets will be the same as the inner rotors 31 with the exception of placing the magnets 32 to the magnetic transfer plates 34; FIG. 4 and then inserting the assembly into the milled recesses (magnets first) and securing with screws 34b.

When the end rotors are facing each other (with the keyways aligned) and with the magnetic transfer plates 34 on the outside, the magnetic transfer plates will be off-set to insure a continuous flux flow across the stators 40. One embodiment of this machine has a sixty degree off-set in the plates.

Figure 9:
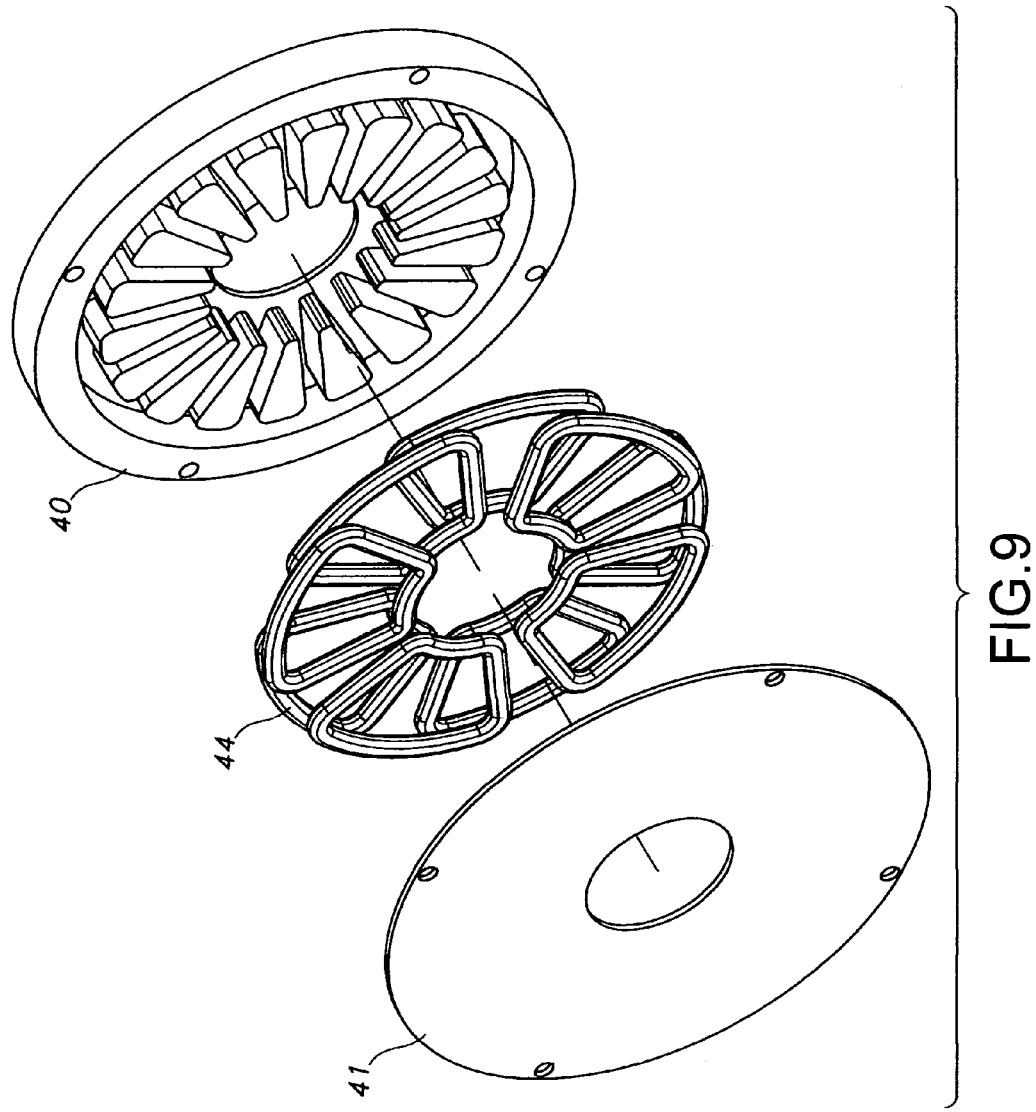

FIG. 9 is an exploded view of a stator assembly 40. Referring to FIG. 9, the stator is constructed with a plurality of grooves for the vertical coil windings 44 to lie in. The stators are attached to the stator support assembly 42 and equally spaced between the rotating magnetic field rotors 30 and 31 which create a continuous axial flux flow across the stators.

Referring back to FIG. 9, the stators are machined from a single piece of non-magnetic, non-metal material with machined grooves to secure the windings and then covered with a non-metal, non-magnetic plate 41. FIG. 9 is one view of a coil winding pattern. FIG. 10 is an exploded view of a sensor plate 50 with a plurality of sensors 51 attached with sensor nuts 51a. Referring back to FIGS. 2, 5, and 6, the small pins attached to the magnetic transfer plates 34, were incorporated to narrow the sensor on time as the magnetic transfer plates rotated beneath the sensor plat as seen in FIG. 2.

Referring back to FIG. 2; is two motor bearing plates 20a and the stator support assembly 42 with stator support assembly nuts 42a. The motor bearings 20b are illustrated on FIG. 3.

OPERATION

The preferred embodiment of this machine is a brushless multi-rotor, multi-stator, direct current electric motor with an axial magnetic flux flow. The magnetic flux is provided by permanent magnets embedded near the outer radius of the rotors. The end rotors have magnetic transfer plates that connect the magnet poles to each other.

The magnetic transfer plates receive the flux and redirect it back through the motor across the stators sandwiched between the pancake type rotors. The magnetic transfer plates and the embedded magnets in the rotors form a continuous and compounded magnetic flux field with a plurality of paths across the energized conductors in the stators.

Beginning at the 12 O'clock position, the flux leaves the end rotor and crosses the stators and inner rotors until it reaches the opposite end rotor and travels 60 degrees in a counter-clockwise direction through the magnetic transfer plate reaching the 10 O'clock position at the next magnet and is redirected back through the motor until it reaches the end rotor completing its first loop and still traveling in a counter-clockwise direction until it reaches another magnet at the 8 O'clock position and is redirected back through the motor for two more loops until it reaches its beginning point.

One embodiment of this machine is commutated electronically with magnetic sensors. One embodiment of this machine has three magnetic transfer plates on the outside of each end rotor that provides a total of six continuous flux fields across the three stator windings connected in series in an axial fashion with the flux path. The last winding in the flux path is connected to the next row of winding 120 degrees counter-clock wise. The windings in the next row are also connected in series and again connected to the third and last row of windings. The windings are wrapped with a soft magnetic material to increase the flux density.

When using only three sensors, one leg of the windings can be connected to positive voltage, the order is 1-4-7, 2-5-8, 3-6-9. When using six sensors and reversing the current every 20 degrees, the order is 147 forward, 369 reverse, 258 forward, 147 reverse, 369 forward, 258 reverse. One embodiment of this machine uses three MOSFET transistors when not reversing the current in the windings; and, three H-Bridge type controllers or equivalent drivers are used when reversing the current. One test used MOSFET chips to reverse the current.

| No Load Test Results on Machine 10 | | | |
| --- | --- | --- | --- |
| RPM | VOLTAGE | AMPERES | WATTS |
| 422 | 6.08 | .197 | 1.198 |
| 1026 | 11.3 | .475 | 5.367 |
| 1340 | 22.0 | .397 | 8.734 |

Test results on DIRECT CURRENT MULTI-STAGE MOTOR 10 were obtained with a fan blade removed from a three speed 20 inch LASCO box fan, Model #3733.

| LASCO fan model #3733 specifications as per sales Rep. | | | |
|---|---|---|---|
| RPM | VOLTAGE | CFM | WATTS |
| 720 | 110 | 1180 | 56 |
| 870 | 110 | 1475 | 69 |
| 1010 | 110 | 1710 | 83 |

| Test Results of Machine 10 Under a Load | | | |
|---|---|---|---|
| RPM | VOLTAGE | AMPS | WATTS |
| 620 | 10.6 | 1.04 | 11.24 |
| 713 | 13.4 | 1.90 | 25.46 |
| 750 | 14.0 | 2.0 | 28.0 |
| 775 | 17.0 | 1.82 | 30.9 |
| 1050 | 22.1 | 1.54 | 34.03 |

I claim:

1. A brushless multi-stage direct current electric motor, comprising:
   a. A plurality of inner rotors and two end rotors embedded with a plurality of magnets with the north pole facing the south pole forming one continuous loop of magnetic flux that flows in at least six paths; with three flux paths flowing in one direction and three flux paths flowing in the opposite direction in an axial fashion from end rotor to end rotor that is parallel with the motor shaft and across all the stators of the motor at the same time;
   b. said end rotors have a plurality of magnetic transfer plates affixed to the outer-most side of each end rotor to accept and redirect the loops of magnetic flux that flows across the stators; wherein
   c. the rotors are attached to a shaft to provide rotational torque, further comprising;
   d. A plurality of stationary non metal stators, machined for windings, is sandwiched between the rotors, the non metal stators, allows the axial flux to travel from rotor to rotor with no eddy currents, no cogging, and no head loss; and
   e. The plurality of windings is for receiving electrical power to produce a magnetic field around the wire windings;
   f. The windings are electrically powered with three phase direct current to produce a magnetic field about the windings, and
   g. A plurality of magnetic sensors that can be operated as a group of three sensors or as a group of six sensors for monitoring shaft position and timing of activation and deactivation of electrical power to the windings.

* * * * *